(12) United States Patent
Sebastian et al.

(10) Patent No.: US 9,023,229 B2
(45) Date of Patent: May 5, 2015

(54) ETCHING METHOD AND DEVICES PRODUCED USING THE ETCHING METHOD

(75) Inventors: Muthu Sebastian, Singapore (SG); Fong Liang Tan, Singapore (SG)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/127,277

(22) PCT Filed: Jul. 13, 2012

(86) PCT No.: PCT/US2012/046640
§ 371 (c)(1),
(2), (4) Date: Dec. 18, 2013

(87) PCT Pub. No.: WO2013/010067
PCT Pub. Date: Jan. 17, 2013

(65) Prior Publication Data
US 2014/0124477 A1    May 8, 2014

(30) Foreign Application Priority Data
Jul. 14, 2011   (SG) .................. 201105168-7

(51) Int. Cl.
*C03C 15/00* (2006.01)
*C23F 1/30* (2006.01)
*C09K 13/04* (2006.01)
*G06F 3/044* (2006.01)

(52) U.S. Cl.
CPC . *C23F 1/30* (2013.01); *C09K 13/04* (2013.01); *G06F 3/044* (2013.01)

(58) Field of Classification Search
CPC .......... C23F 1/30; C23F 1/00; H01L 21/3213; H01L 21/32134
USPC ........... 216/41, 51, 76, 95, 97, 102, 106, 103, 216/61; 438/745, 754, 756
See application file for complete search history.

(56) References Cited

U.S. PATENT DOCUMENTS

| | | |
|---|---|---|
| 3,348,987 A | 10/1967 | Stark |
| 3,942,981 A | 3/1976 | Sato |
| 3,960,560 A | 6/1976 | Sato |
| 3,966,473 A | 6/1976 | Sato |

(Continued)

FOREIGN PATENT DOCUMENTS

| | | |
|---|---|---|
| JP | 2009-235438 | 10/2009 |
| WO | WO 2011-010503 | 1/2011 |

OTHER PUBLICATIONS

Toupance, "Conditions Of Formation Of Copper Phyllosilicates In Silica-Supported Copper Catalysts Prepared By Selective Adsorption", J. Phys. Chem. B., Feb. 2002, vol. 106, No. 9, pp. 2277-2286.

(Continued)

*Primary Examiner* — Lan Vinh
(74) *Attorney, Agent, or Firm* — Clifton F. Richardson

(57) ABSTRACT

A double ITO structure, containing sequential layers of indium tin oxide (ITO), silicon dioxide ($SiO_2$) (which may include a dopant material) and ITO, is selectively protected by a patterned photo-resist mask. The sequential layers are etched together in a single etching step using an etchant composition which is an acidic solution containing a transition metal chloride and hydrochloric acid (HCl). Thus, the double ITO structure is etched using a substantially fluoride-free etchant composition.

18 Claims, 11 Drawing Sheets

(56) References Cited

U.S. PATENT DOCUMENTS

| | | |
|---|---|---|
| 4,878,993 A | 11/1989 | Rossi |
| 5,094,978 A | 3/1992 | Miyagaki |
| 5,456,795 A | 10/1995 | Danjo |
| 5,528,102 A | 6/1996 | Gnade |
| 5,976,988 A | 11/1999 | Konuma |
| 6,254,796 B1 | 7/2001 | Rath |
| 6,936,183 B2 | 8/2005 | Chinn |
| 7,470,628 B2 | 12/2008 | Ko |
| 2006/0289383 A1* | 12/2006 | Song et al. ............ 216/23 |
| 2007/0029280 A1 | 2/2007 | Lee |
| 2008/0217576 A1 | 9/2008 | Stockum |
| 2009/0040590 A1* | 2/2009 | Sasagawa ............ 359/290 |
| 2010/0072884 A1* | 3/2010 | Tchakarov et al. .......... 313/504 |
| 2010/0245973 A1* | 9/2010 | Wang et al. ............ 359/275 |
| 2012/0267614 A1 | 10/2012 | Tajima |

OTHER PUBLICATIONS

International Search Report for PCT International Application No. PCT/US2012/046640 Mailed on Jan. 23, 2013, 3 pages.

* cited by examiner

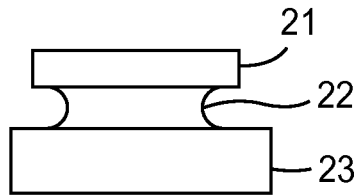
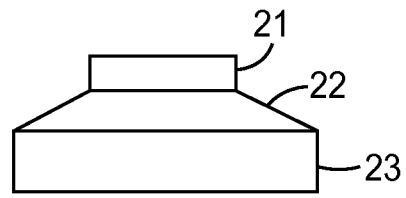
FIG. 1A
Prior Art
FIG. 1B
Prior Art
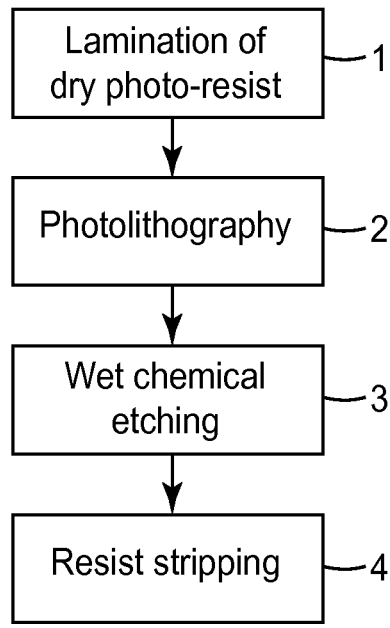
FIG. 2

↓ Lamination of dry photo-resist

↓ Photolithograph

↓ Wet Chemical Etching

↓ Resist stripping

US 9,023,229 B2

ETCHING METHOD AND DEVICES PRODUCED USING THE ETCHING METHOD

TECHNICAL FIELD

The invention relates to a method for etching a microstructure comprising sequential layers of indium tin oxide (ITO), silicon dioxide ($SiO_2$) (which may include a dopant material), and ITO, formed on a transparent or semi-transparent substrate.

BACKGROUND

The market for devices having touch-sensitive screens is increasing very rapidly. Many of these devices are mobile devices with touch screens, such as, mobile communications devices. Other such devices include multi-touch displays (that is, display devices which are able to detect the respective positions on the screen of three or more distinct contacts) and computers with touch-sensitive screens.

Touch sensitive screens use charge coupled device image sensors. The sensors often employ a double ITO structure. Such a structure has a first transparent, conductive ITO electrode separated from a second transparent, conductive ITO electrode by a thin insulating layer of silicon dioxide or silicon dioxide doped with a conductive metal. The double ITO structure is produced by forming sequential layers of ITO, $SiO_2$, and ITO on a transparent or semi-transparent substrate, and then selectively etching the layers. The remaining portions of the double ITO structure provide electrodes on the surface of the substrate.

The steps of etching the different layers are a crucial step in fabricating a microelectronic component. One method widely employed for etching an article carrying a layer to be etched is to overlay the layer with a suitable patterned mask and then to immerse the layer and mask in a chemical solution that attacks the layer while leaving the mask intact and while only etching other materials of the article to a minimal extent. This process is conventionally applied to the etching of a double ITO structure comprising sequential layers of ITO, $SiO_2$, and ITO, by performing multiple etching steps for the different respective layers.

Specifically, the method used to etch each ITO layer has been by immersion in a hot acidic solution, such as, hydroidic or nitric acid solutions, or a hydrochloric acid solution with a concentration such as 2N. Such an acid etches the material isotropically and may strip away the photo-resist, potentially leading to etching of incorrect portions of the layers beneath. US 20080217576 (Stockum et al) discloses the use of phosphoric acid based etching paste to etch oxidic conductive layers.

U.S. Pat. No. 5,456,795 (Danjo et al) discloses using an aqueous mixture of etchant containing hydroiodic acid and ferric chloride for etching ITO to form a minute electrode pattern.

Most etchant compositions for ITO acidic cannot etch silicon dioxide. Instead, a silicon dioxide layer is conventionally etched using an etching composition which contains environmentally unfriendly fluorine-containing compounds, such as, HF or $NH_4F$. The mechanism for the etching of the silicon dioxide is dissolution of the silicon dioxide. For example, U.S. Pat. No. 5,976,988 (Konuma et al) describes a fluoride based etching solution to etch silicon oxide, alumina and a silicon nitride film. U.S. Pat. No. 6,254,796 (Rath et al) describes selective etching of silicate glass using a fluoride-containing compound and certain organic solvents. U.S. Pat. No. 6,936,183 (Chinn et al) describes isotropically etching a silicon oxide layer sandwiched between two silicon-containing layers with a gaseous hydrogen fluoride-water mixture. U.S. Pat. No. 7,470,628 (Ko) describes the use of fluorocarbon gases for etching silicon dioxide.

Etching an $SiO_2$ layer on an article is a particularly difficult if the other portions of the article also include $SiO_2$ or its alloys, since the other portions of the article are also exposed to the etching composition.

Note that these referenced documents are concerned with etching either ITO or $SiO_2$, not both.

FIGS. 1A and 1B illustrate two problems which may occur when a double ITO structure is etched using a patterned photo-resist mask. Ideally, the unetched portion of the double ITO structure (that is, the portion of the double ITO structure which remains after the etching) should have a pattern very similar to that of the patterned photo-resist mask. However, if the double ITO structure is etched in locations below the side portions of the photo-resist mask, the result is called "over etching". This is illustrated in FIG. 1A where the unetched portion 22 of the double ITO structure is narrower than the photo-resist mask 21 in the lateral direction (that is, in the direction parallel to the surface of the substrate 23). Over-etching leads to lead lifting (i.e. separation of the electrode from the substrate) as the leads become too thin. Conversely, FIG. 1B illustrates a problem called "under-etching", in which the unetched portion 22 of the double ITO structure extends laterally beyond the photo-resist mask 21. Under-etching results in short circuits since adjacent leads are shorted.

SUMMARY

The present invention aims to provide a new and useful method for etching a layered structure having sequential layers of indium tin oxide (ITO), silicon dioxide ($SiO_2$) (which may include a dopant material), and ITO formed on a transparent or semi-transparent substrate.

The invention is based on the novel concept of employing a single etchant composition to etch both the $SiO_2$ and the ITO together. Some known etchant compositions could potentially do this, such as hydrofluoric acid solution, or some strongly alkaline etching compositions, but to our knowledge these etchant compositions have not been used for this purpose. Furthermore, hydrofluoric acid is toxic, and strongly alkaline etchant compositions would attack the substrate if it is PET.

In general terms, the invention provides that a double ITO structure, that is a structure containing sequential layers of ITO, $SiO_2$ (which may include a dopant material) and ITO, is selectively protected by a patterned photo-resist mask, and that the sequential layers are etched in a single etching step, thereby removing selected portions of the double ITO structure. It has been found that this is possible by employing as the etchant composition an acidic solution containing a transition metal chloride and hydrochloric acid (HCl).

The invention makes possible a cheaper and environmental friendly way of patterning the double ITO structure, through a dry photo-resist photolithographic process and wet etching step. In particular, the double ITO structure may be etched using a substantially fluoride-free etchant composition.

It is advantageous to select an etchant composition which etches ITO layers and the $SiO_2$ layer at similar etching rates.

Preferably, the transition metal chloride is ferric chloride or cupric chloride.

The hydrochloric acid in the etchant composition may have a concentration in the range 0.01-1.0N. In one possibility it has a concentration of about 0.02-1.0N. A value towards the lower end of the range (e.g. below 0.5N) is preferred to minimize the risk of the concentration of Chloride ions accidentally rising too high, which might lead to over-etching and/or release of chlorine gas. The concentration range 0.01-1.0N is lower than the concentration range used in conventional techniques for etching ITO, which reduces the risk of the patterned photo-resist mask being stripped before the double ITO structure has been etched. Thus, an etching time can be chosen which etches the double ITO structure in the regions not covered by the patterned photo-resist mask, without damaging the photo-resist.

Note that the fact that $SiO_2$ can be etched by the proposed etching composition is surprising, since $SiO_2$ is not soluble in such a composition, and (as mentioned above) conventional techniques for etching $SiO_2$ rely on dissolution. Without being bound by theory, it is currently believed that mechanism by which the $SiO_2$ is etched in the present invention may be that the transition metal chloride causes cracks in the surface of the $SiO_2$, such that pieces of the $SiO_2$ fall away. This mechanism is fundamentally different from existing techniques.

As noted above the $SiO_2$ may include a dopant, such as aluminum, silver or zinc. In this document $SiO_2$ doped with aluminum, which is often referred to as silicon aluminum dioxide, will be referred to as $SiAlO_x$. This term does not limit the atomic ratio of silicon to aluminum, but the proportion of aluminum atoms will typically be less than that of silicon atoms, and may be about 10% of the total number of aluminum and silicon atoms. In other words, there may about 90% of silicon atoms and 10% of aluminum atoms.

Embodiments of the invention provide both methods for etching a double ITO structure on a transparent or semi-transparent substrate, and devices produced by the method. In at least one embodiment of a device of the invention, the unetched portion of the double ITO structure includes a matrix of row and column electrodes. The device may be a touch sensitive screen, preferably a capacitative-type touch screen. The touch sensitive screen may be for use in a mobile phone, display, or computer. A few examples of apparatus into which the screen can be incorporated are GPS devices, PDAs, Interactive TVs, e-book readers, kiosks (e.g. for food and beverages), gaming machines, entertainment apparatus (e.g. for movie on demand), financial apparatus such as automatic transaction machines (ATMs), interactive signage apparatus, fitness equipment, etc.

The above summary of the present invention is not intended to describe each disclosed embodiment or every implementation of the present invention. The Figures and detailed description that follow below more particularly exemplify illustrative embodiments.

BRIEF DESCRIPTION OF THE DRAWINGS

Embodiments of the invention will now be described, for the sake of illustration only, with reference to the following drawings, in which:

FIG. 1 is composed of FIGS. 1A and 1B which respectively illustrate over-etching and under-etching of a double ITO structure using a patterned photo-resist mask;

FIG. 2 shows the steps of an embodiment of the present invention;

DETAILED DESCRIPTION

Figure 3A:
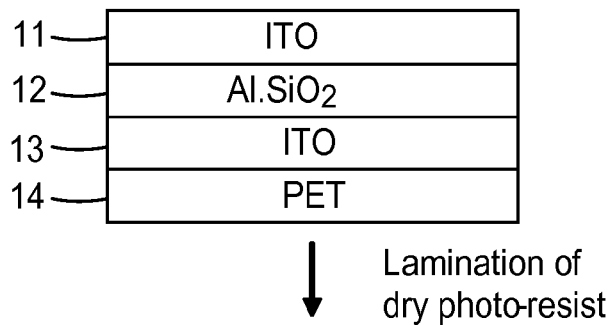
FIGS. 3A to 3E illustrate structures at corresponding times in a method of FIG. 2.

In the following detailed description of the preferred embodiments, reference is made to the accompanying drawings that form a part hereof. The accompanying drawings show, by way of illustration, specific embodiments in which the invention may be practiced. It is to be understood that other embodiments may be utilized, and structural or logical changes may be made without departing from the scope of the present invention. The following detailed description, therefore, is not to be taken in a limiting sense, and the scope of the invention is defined by the appended claims.

FIG. 2 shows the steps of an etching method which is an embodiment of the invention, to etch a double ITO structure. A suitable double ITO structure is illustrated in cross-sectional view in FIG. 3A, and consists of three layers 11, 12, 13 formed sequentially on a transparent substrate 14. The transparent substrate 14 may be formed from any material with high transmittance (e.g. more than 85%) and with a low haze value (e.g. the haze value defined according to the international ASTM D1003 standard, may be under 1%; this value can be measured using a haze meter, such as the HAZE-GARD II manufactured by Toyo-Seiki Seisaku-sho Ltd. of Japan). The transparent substrate 14 may be polyethylene terephthalate (PET). Alternatively, it may be any one of polyethylene naphthalate (PEN), polyimide (PI), polycarbonate (PC), polyethersulfone (PES), polyacrylate (PA), polynorbornene (PNB), polyetheretherketone (PEEK), polyetherimide (PEI), or glass. It may be a flexible substrate, or inflexible.

The three layers 11, 12, 13 are a lower ITO layer 13, a layer 12 of $SiO_2$ optionally doped with aluminum (that is, $SiAlO_x$), and an upper ITO layer 11. Desirably, the double ITO structure has a transmittance of at least about 90% at wavelengths above about 475 nm, and a resistance of about 120 Ω/sq (plus or minus 20 Ω/sq). Conceivably thin layers of other materials (conductive metals or metal oxides) may be present between the transparent substrate 14 and the layer 13 and/or between pairs of the layers 11, 12, 13, but that possibility is not considered further here.

Figure 3B:
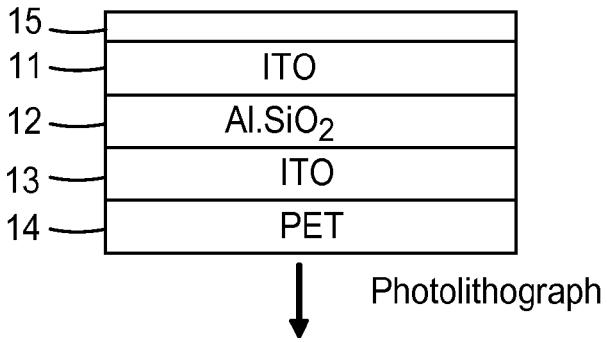

In a first step of the method (step 1 of FIG. 2) a dry photoresist layer 15 is laminated onto the upper ITO layer 11, to give the structure shown in FIG. 3B.

Figure 3C:
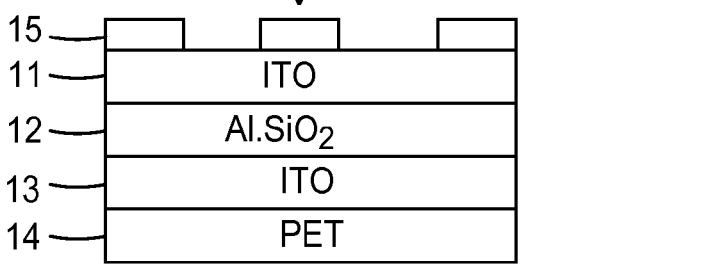

Step 2 of the method is a photolithography step of exposing selected areas of the photoresist layer 15 to UV light to produce cross-linking, and developing the photoresist layer 15 with a dilute aqueous solution, thereby removing portions of the photoresist layer 15 which are not cross-linked. This produces a structure as shown in FIG. 3C.

Figure 3D:
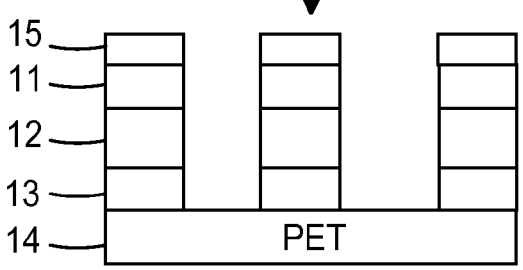

In step 3 of the method, the portions of the layers 11, 12, 13 not covered by the remaining portions of the photoresist 15 are etched with an etching solution, to give the structure shown in FIG. 3D.

Figure 3E:
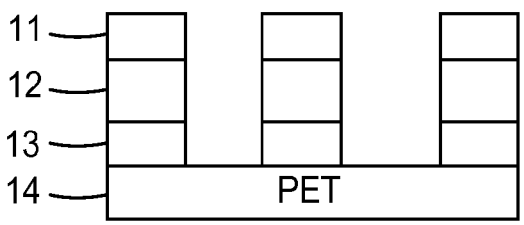

In step 4 of the method, the remaining portions of the photoresist layer 15 are stripped away, to give the completed structure of FIG. 3E.

We now provide examples based on the process of FIG. 2. In all these examples, steps 1, 2 and 4 are carried out in the same manner, but step 3 is performed in differing ways. The examples are classified into two groups, which differ in the transition metal chloride contained in the etching composition used in step 3. Note that the examples are illustrative only. The experimental parameters, and the particular materials and amounts thereof recited in these examples, as well as other conditions and details should not be construed to unduly limit this invention.

In the examples, the transparent substrate 14 was a layer of PET, and had thickness of 125 microns. Each layer 11, 13 of ITO had a thickness of 20-25 microns. The $SiO_2$ layer 12 had a thickness of 40-45 microns. If the thickness of the $SiO_2$ layer 12 is significantly outside this range, for example above about 50 microns, this may lead to inferior optical or electrical properties. The layers 11, 12 and 13 were formed by sputtering. The $SiO_2$ layer 12 is formed with an aluminum dopant, with a target aluminum atomic concentration of 10% of the number of silicon atoms.

Suitable photoresists to be used in step 1 are aqueous photoresists based on polymethly-methacrylates, such as those commercially available from Kolon Industries of South Korea under the trade name KP2150. Other suitable photoresists are UH3215 (also from Kolon Industries) and NIT2325 (from Nichigo-Morton Co., Ltd of Japan). It was found that a suitable etching profile of the sensor electrode was produced if the thickness of the photoresist layer 15 is in the range of 15-50 microns. Specifically, the examples were performed using thicknesses of 15, 25 and 50 microns. A thinner photoresist layer gave a better result. Specifically, thinner photoresist, such as UH3215 and NIT2325 with a thickness 15 microns and 25 microns respectively, was found suitable for fine pitch development such as 30/30 (i.e. leads of width 30 microns spaced apart by 30 microns), but the thicker photoresist (such as KP2150 with a 50 micron thickness) was not suitable for fine pitch development. The minimum pitch we obtained for the KP3215 was 50/50 pitch (i.e. leads of width 50 microns, spaced apart by 50 microns). For thinner photoresist the light traveling distance during step 2 is shorter and hence polymerization of the exposed photo-resist is very uniform from top to bottom, whereas for the thicker photo-resist the top layer of exposed photo-resist polymerizes faster than the bottom surface which is in contact with ITO layer 11. The unpolymerized area may dissolve in the developing solution which may lead to resist delamination from the ITO surface. This gives an undercut problem since the etching solution seeps into the interface between the ITO layer 11 and the photo-resist. Another known phenomena is the capillary effect: for a thinner resist the etching solution can easily reach the etching surface, whereas the etchant may not reach the etching surface when the photo-resist is thicker and the spacing (parallel to the surface of ITO layer 11) between the bodies of photo-resist is narrower.

The adhesion between the photo-resist and the substrate also differs depending on the choice of photo-resist. Furthermore, each photo-resist had a different cost. NIT2325 had the best adhesion and thickness, and made it possible to obtain very fine pitch, but KP2150 was preferred from a cost point of view. The technical data for NIT2325 provided by Nichigo-Morton Co., Ltd indicates that the substrate should be pre-heated to a surface temperature of 40-60° C., and that the lamination should be performed with a temperature of 100-120° C., at a pressure of 0.2-0.4 MPa and at 1.0-2.5 m/min, with a hold time of more than 15 minutes. An exposure of 110-150 $mJ/cm^2$ is recommended, with another hold time of more than 15 minutes. Developing of the photo-resist should use a solution which as 0.7-1.0% by weight of Sodium Carbonate at 27-30° C., and a pressure of 0.10-015 MPa. For example a solution which was 1.0% by weight of Sodium carbonate, at 30° C. and 0.15 MPA takes 20-26 seconds. The recommended stripping conditions are a solution which was 2-3% by weight of Sodium hydroxide, at a temperature of 40-70° C. and a pressure of 0.15-0.20 MPa. For example a solution which was 2.5-3.0% by weight of Sodium hydroxide, at 50° C. and a pressure of 0.15 PMa takes 70-96 seconds.

In step 2 the UV-light was projected on a desired portion of the photoresist layer 15. The portion of the photoresist layer 15 exposed to the UV light underwent polymerization, whereas the portion of the photoresist layer 15 protected from the UV light remained unchanged.

The latter portion of the photoresist was removed using developing solution. A suitable developing solution is a dilute base, which is water soluble. For example, sodium carbonate can be used as a suitable etchant to remove the photoresist that has not been exposed to UV light. The remaining portion of the photoresist layer 15 is used as the etching mask for etching the layers 11, 12, 13. It is important to control the developing process to achieve good resist side walls and a good resist footprint image. Examples were carried out to find out the impact of the developing solution on the double ITO structure, and it was found that, using a developer which was a solution of 0.89% by weight sodium carbonate at 25° C. and with a pH of 10.6, the double ITO structure remains intact even after 2 hours.

We now present experimental results relating to the etching step 3. These are grouped into two sections, which differ in the transition metal chloride used in the etching composition.

1. Performing Step 3 Using an Etching Composition Including Cupric Chloride

In this case, the etching step 3 was performed by exposing the upper surface of the structure shown in FIG. 3C to a comparative etching solution having only cupric chloride (Example C1) and to etching compositions of the present invention including hydrochloric acid and cupric chloride. Specifically, the structure was inserted into a beaker containing the etching composition. Six different examples were prepared using the concentrations, temperatures of the etching composition, and etching times given in Table 1.

TABLE 1

| Example No. | CuCl2•5H2O (Cu2+ g/lit) | HCl (N) | Temperature (° C.) | Etch time (s) | Remarks |
| --- | --- | --- | --- | --- | --- |
| C1 | 100 | 0 | 48 | 30 | Under-etching. The exposed areas also exhibited cracks. |
| 2 | 100 | 1 | 48 | 10 | Under etching |
| 3 | 100 | 1 | 48 | 30 | Normal etching |
| 4 | 100 | 1 | 48 | 180 | Over etching |
| 5 | 100 | 1 | 48 | 300 | Over etching |
| 6 | 180 | 0.04 | 48 | 30 | Normal etching |

Example numbers 2-6 corresponded to an etchant composition which had an oxidation-reduction potential (ORP) in the range 580 mV-670 mV measured at 27° C. One suitable specific value was 650 mV. ORP is a measure of the ratio of $Cu^{2+}$ to $Cu^+$ ions in the solution. Specifically, ORP is measure of a potential defined by the Nernst equation $E=E°-2.303RT/nF \, Log(Cu^{2+}/Cu^+)$. If the ORP is lower below 480 mV this may tend to result in under-etching because of the lower $Cu^{2+}$ concentration and higher $Cu^+$ concentration. If the ORP is higher 670 mV there may be a risk of over saturating the bath, and thus a chlorine out-gassing problem.

The cupric chloride chemistry etched the ITO-$SiAlO_x$-ITO layers sequentially within the single processing step 3 using a single etching composition, without affecting the dry photoresist.

The ITO etching reaction was:

$$In_2O_3SnO_2 + 10HCl + Cu^{2+} \rightarrow 2In^{3+} + Sn^{4+} + 5H_2O + 10Cl^- + Cu^+$$

Possible mechanisms for etching ITO are known in the literature.

The $SiO_2$ etching reaction (applicable also to the doped silicon dioxide, $SiAlO_2$) is as discussed in *J. Phys. Chem. B.* 2002, 106, 2277. Without being bound by theory, it is believed to be copper phyllosilicate formation, as follows:

$$SiO_2 + H_2O \leftrightarrow Si(OH)_4 \xrightarrow{Cu^{2+}} Si\text{—}O\text{---}Cu \rightarrow Cu_2Si_2O_5(OH)_2$$

It is not yet certain to what extent this results in dissolution of the $SiAlO_x$, or whether this dissolution results in the crack formation in the $SiAlO_x$.

Thus, the etching reaction involves the transformation of $CuCl_2$ (that is, the cupric, or copper (II), chloride) to $2CuCl$ (that is, the cupress, or copper (I), chloride). The regeneration action, performed using the hydrochloric acid, is:

$$2CuCl + 2Cl^- \rightarrow 2CuCl_2$$

The source of the chlorine ions is the hydrochloric acid (HCl) which disassociates as:

$$2HCl \rightarrow 2H^+ + 2Cl^-$$

The experiments explained above were performed many times on different samples of PET substrates covered by a double ITO structure. Initially, the etchant composition was exactly as defined above. However, after a certain number of samples had been etched, it was found that the proportion of CuCl in the etching composition had risen. Accordingly, an oxidant (sodium chlorate) was added to transform some of the accumulated CuCl back into $CuCl_2$. Alternatively, hydrogen peroxide could be used as an oxidant. This process was performed automatically. Specifically, ORP or Ultraviolet-visible spectroscopy measurement was used to determine the ratio of $CuCl_2$ to CuCl, and a suitable amount of oxidant was added to return this ratio to the desired range. The oxidant reactions, which generate additional chloride ions for the regeneration reaction, are as follows:

$$H_2O_2 + 2HCl \rightarrow 2Cl^- + 2H_2O$$

$$NaClO_3 + 6HCl \rightarrow NaCl + 6Cl^- + 3H_2O$$

Step 4 was performed by stripping the remaining photoresist with a stripper and then drying. The stripper used was mixture of mono-ethanol amine (MEA) and water. A range of different ratios of water and MEA are suitable. In these experiments the stripper composition was 40 volume % of MEA and 60 volume % of water at 45-50° C. Note that a traditional stripper such as Sodium hydroxide or Potassium hydroxide solution would typically not be suitable, because it would etch the ITO layers 11, 13 and attack the PET substrate 14.

The resultant structures were then examined with an optical microscope and a scanning electron microscope (SEM).

Figure 4:
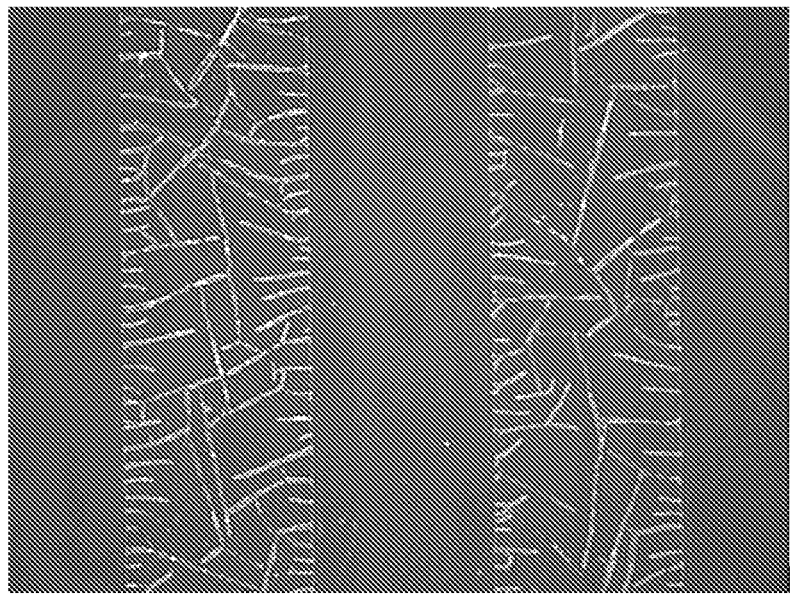
FIGS. 4 and 5 are optical microscope images of a structure produced using the method of FIG. 2 under experimental conditions which led to an under-etch.
Figure 5:
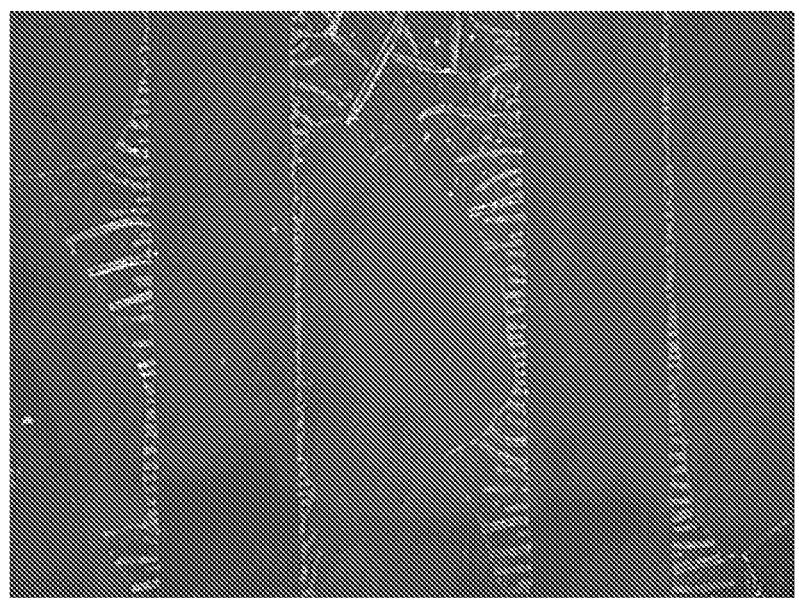

FIG. 4 is an optical microscope picture for experiment 2. In this case, there was under-etching, due to the etching being carried out for an insufficient time (10 seconds). FIG. 5 is an optical microscope picture for an etching experiment identical to experiment 2, except that the etching time was 20 seconds. Comparative Example 1 also gave under-etching.

Figure 6:
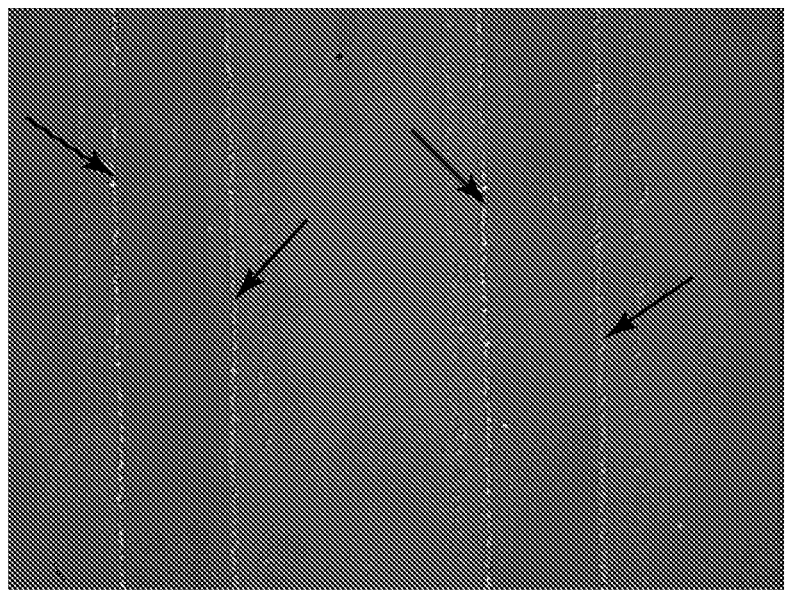
FIGS. 6 and 7 are optical microscope images of a structure produced using the method of FIG. 2 under experimental conditions which led to an over-etch.
Figure 7:
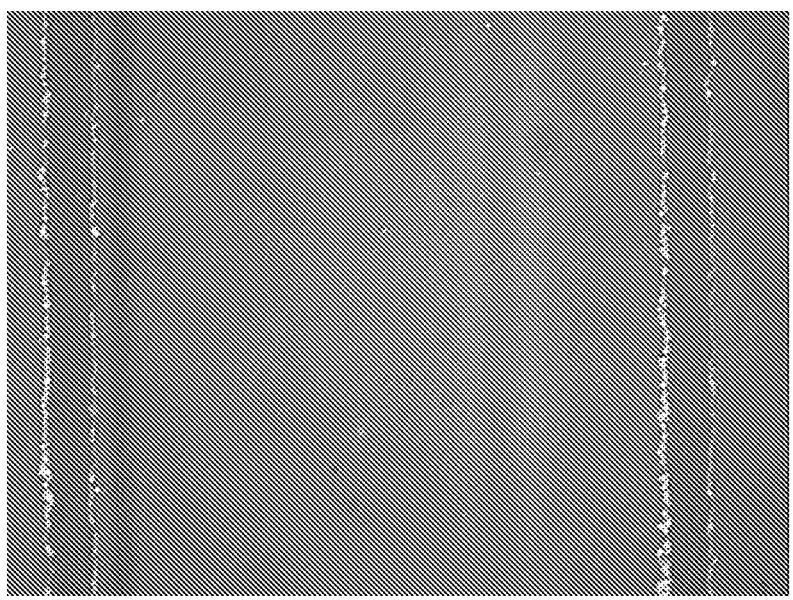

FIGS. 6 and 7 show optical microscope pictures for example 4 and example 5 respectively. In FIG. 6 there was mild overetching, due to the etching being carried out for an excessive time (3 minutes). This example failed to provide a good etching profile with a normal-tapered. Due to over etching the lead width became smaller and the space between electrodes became wider. In FIG. 7 there was severe over-etching.

The range of suitable times for the etching depends upon the type and thickness of the sensor conductors to be etched. However, from table 1 it can be seen that a suitable time is typically from about 20 seconds to 2 minutes. However, in other embodiments step 3 will be carried out by spraying the etchant composition, and in this case the range of suitable times will depend on the spray pressure and spraying technique. A suitable etching time depends on a number of factors, including the thickness of the layers, the respective concentrations of the components of the etching composition, etc. One skilled in the art would be able to determine a suitable etching time for different double ITO structures based on the teachings of this document.

A suitable range for the concentration of cupric chloride was 100-180 g/liter. At a concentration above 200 g/liter there may be solubility problems, and it may be harder to reach small recesses in the structure to be etched. A concentration below 50 g/liter tends to increase the required etching time.

A suitable range for the concentration of HCl was 0.02-1.0N, with the actual range used being 0.04-1.0N. The lower end of the range (e.g. below 0.05N) is preferred to avoid a risk of the concentration of Chloride ions accidentally becoming too high, which might lead to over-etching, and to the release of chlorine gas.

A suitable range of temperature for the etching composition at the time that step 3 is performed is 45-65° C., but the etching examples 1 to 6 were prepared at a temperature of 48° C. In fact, it is expected that the higher the temperature the better in terms of reducing the required time for etching (subject to a preference that, since it is an aqueous solution, it should not have a temperature above 100° C., or else the evaporation of the water would lead to a need to keep topping the water up).

Figure 8:
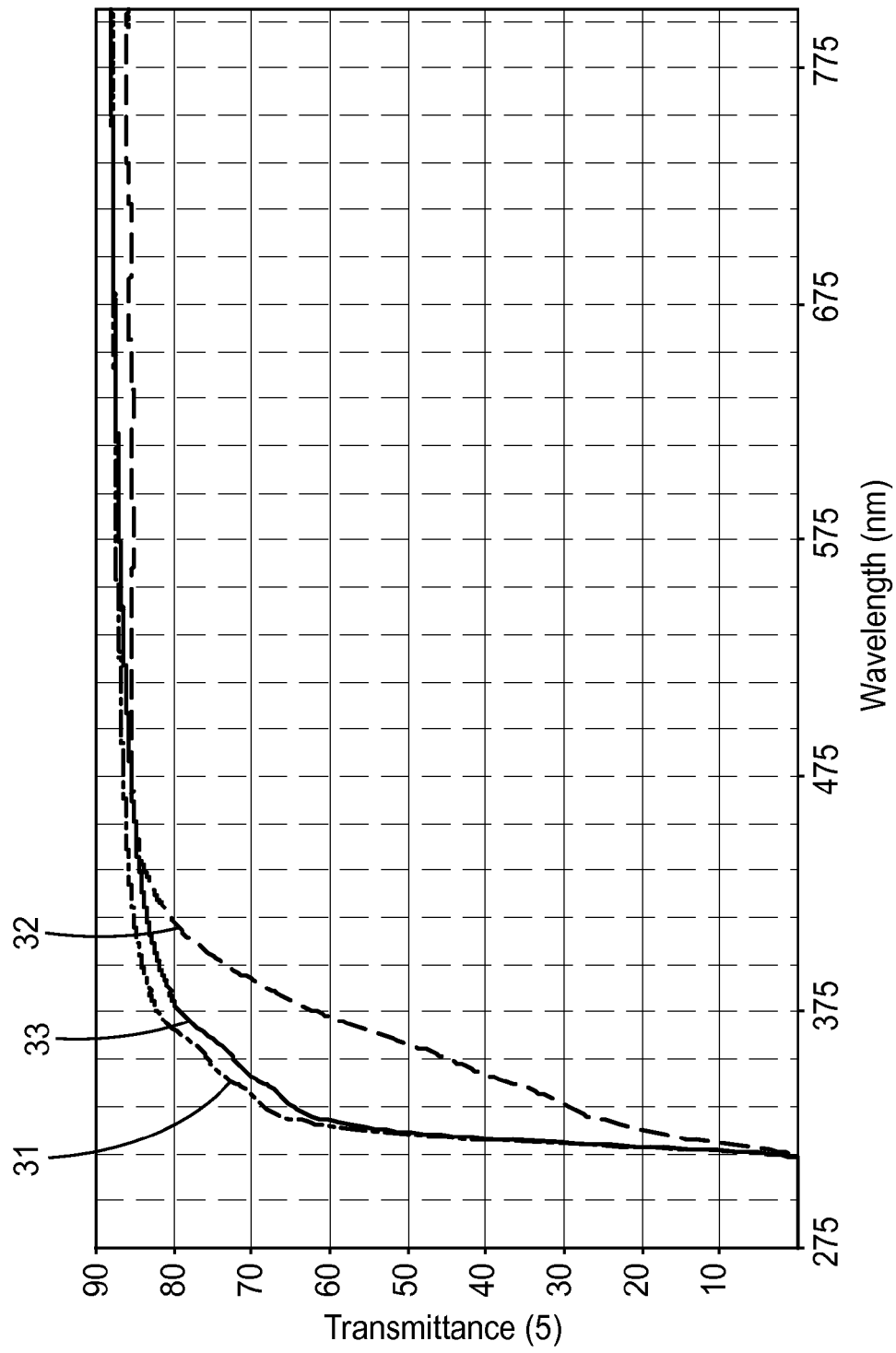
FIG. 8 shows transmittance spectra before, during and after performance of a method as illustrated in FIG. 2.

FIG. 8 shows example measurements of the transmittance spectra of the sample at three times. Line 31 is the transmittance spectrum of the PET before the double ITO structure is deposited onto it. Line 32 is the transmittance spectrum of the PET and double ITO structure before lamination of the photoresist (i.e. the structure shown in FIG. 3A). Line 33 corresponds to the transmittance spectrum of one of the portions of the etched structure where the double ITO structure has been etched away. In fact, it is hard to generate such a data line using an element having the structure of FIG. 3E (this is because the measurement—which we performed using a PERKIN ELMER Lambda 20 UV/Vis spectrometer—had to be performed over an area of at least 1 cm by 2 cm, and such an area contains both etched and un-etched areas if the etching is on the micron scale; thus, one has to consider the respective contribution to transmittance from both the etched and un-etched areas), so the line 33 was instead produced as follows. Three PET substrates covered on one surface with a double ITO structure, and onto which no photo-resist had been laminated, were etched over the whole of that surface using the etching conditions of examples 3-6 respectively. Line 33 was produced using the sample which was etched using the etching conditions of example 6, but examples 3-5 gave a substantially similar line 33. It will be seen that line 33 is very close to line 31, and in particular the transmittance is greater than 80% throughout a wavelength range of 375-775 nm, and above 85% throughout a wavelength range of 450-800.

Figure 9A:
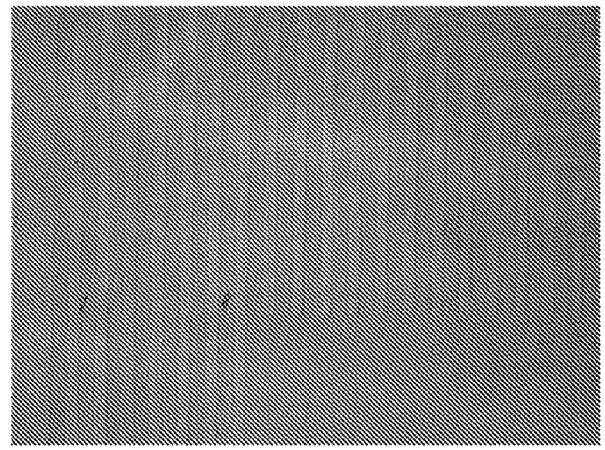
FIGS. 9A, 9B and 9C are optical images of structures produced using the method of FIG. 2.
Figure 9B:
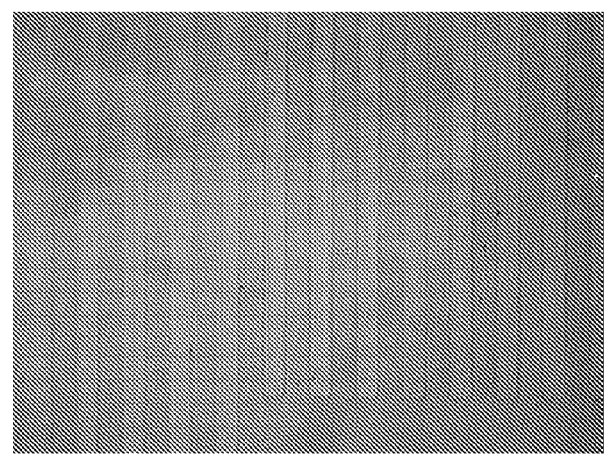
Figure 9C:
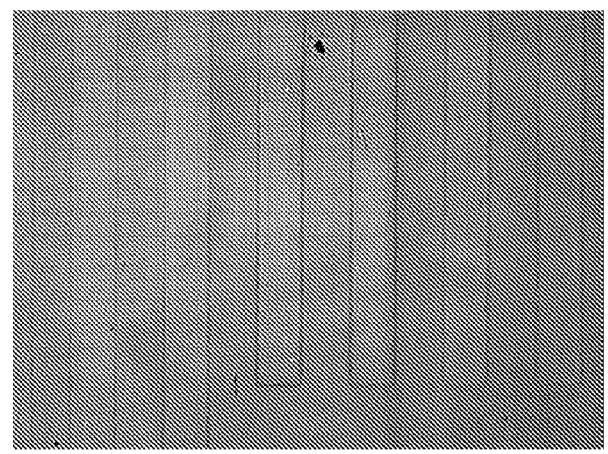

FIG. 9A shows an electron microscope image of the etched structure following step 4 (that is, as shown in FIG. 3E) performed using the experimental conditions shown in Table 1 as Example 6. Elongate areas of unetched double ITO structure with width 30 microns are spaced apart by gaps of 30 microns. FIG. 9B is a corresponding image in which the elongate areas of unetched double ITO structure have width 50 microns and are spaced apart by gaps of 50 microns. FIG. 9C is a similar image in which the elongate areas of unetched double ITO structure have width 100 microns and are spaced apart by gaps of 100 microns.

Figure 10A:
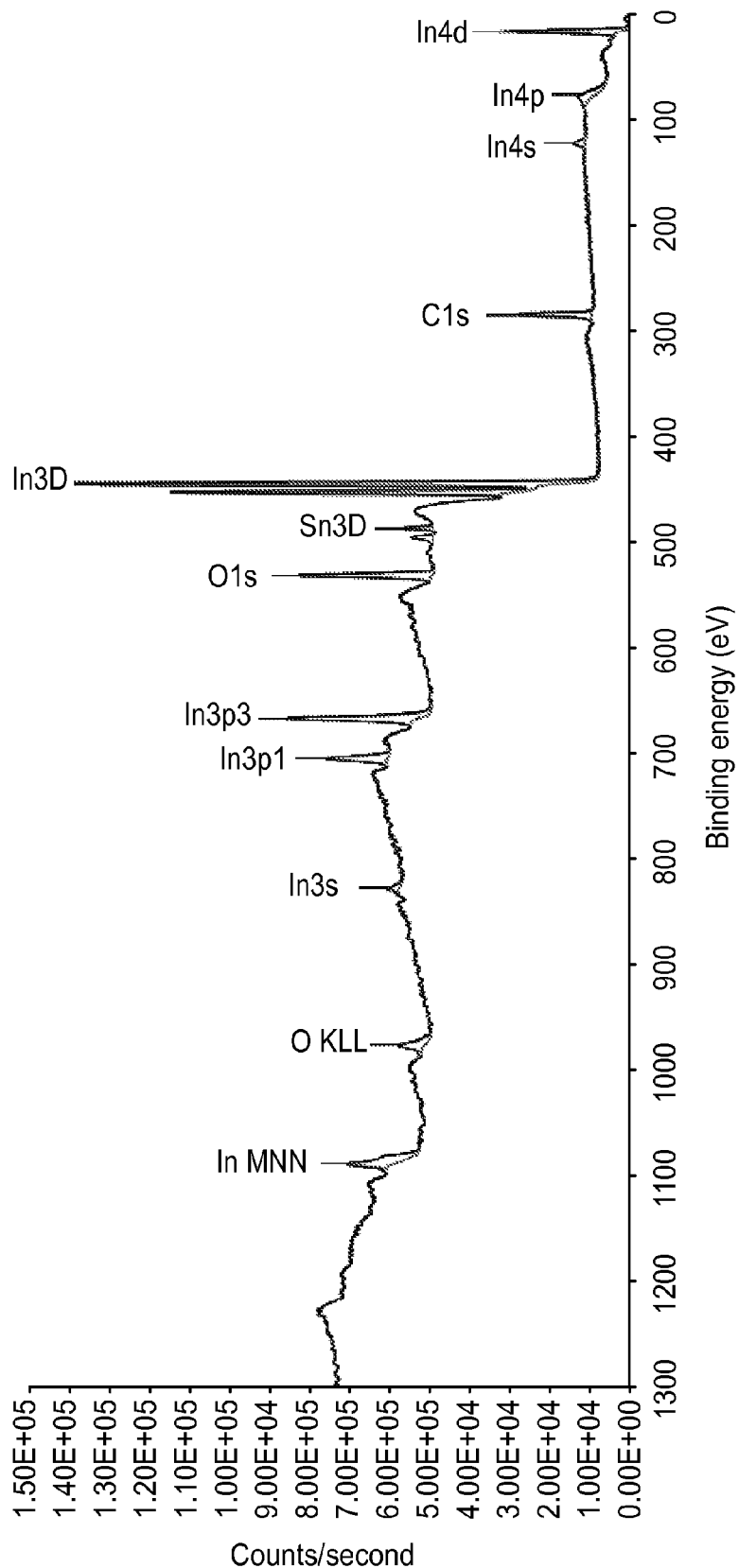
FIGS. 10A and 10B are X-ray photoelectron spectra of, respectively, a PET substrate covered with a double ITO structure, and of the PET substrate after the double ITO structure has been removed by etching.
Figure 10B:
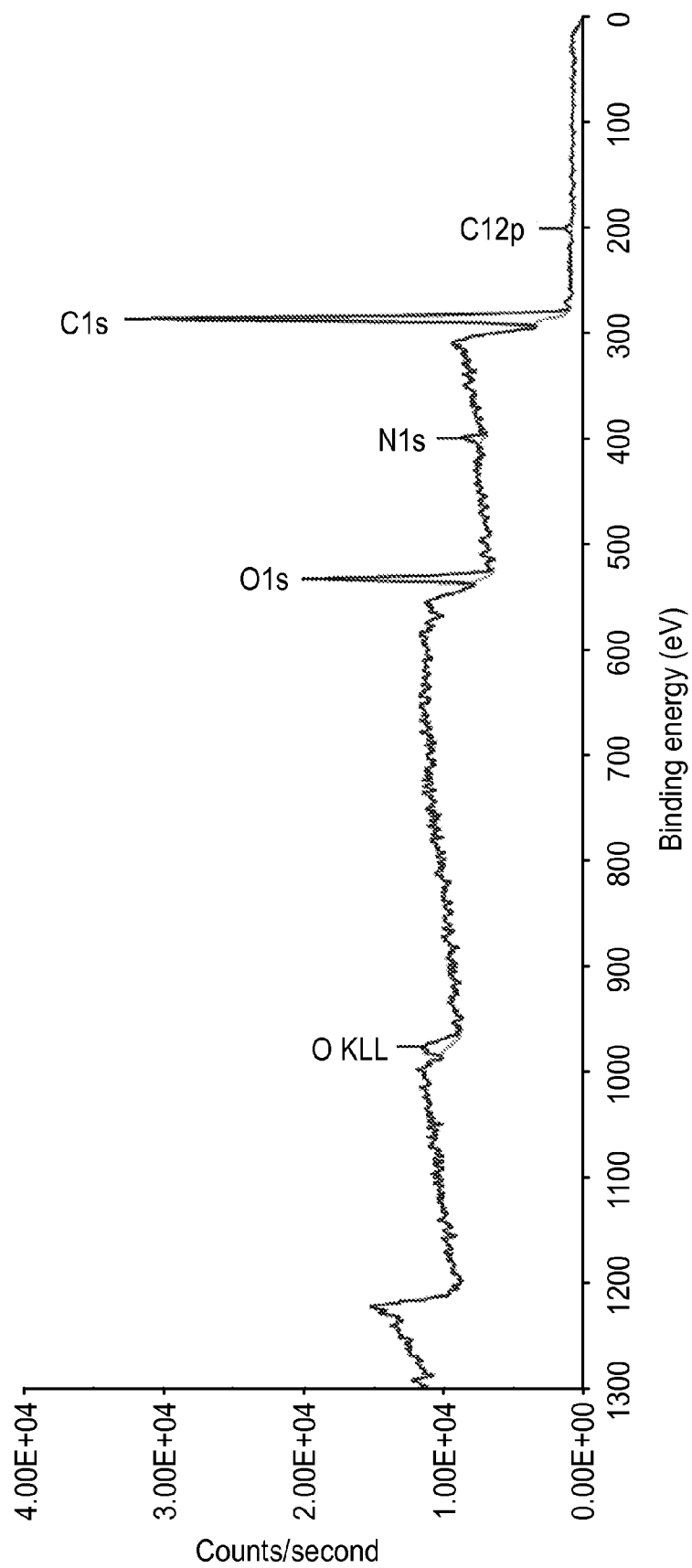

FIG. 10A is an XPS (X-ray photoelectron spectroscopy) spectrum of a PET substrate covered with a double ITO structure prior to etching. FIG. 10B is the XPS spectrum following the etching using example 6. It will be seen that no traces of silicon, aluminum, indium or tin remain on the surface after etching the ITO from the PET surface. This demonstrates that the cupric chloride can completely remove the ITO stack. Note that XPS probes only the top 4-10 nm of a surface. This is why no peak corresponding to Si or Al is observed in FIG. 10A: the Si and Al is beneath a layer of ITO. The absence of such a peak in FIG. 10B demonstrates that no Si or Al is present on the surface of the substrate exposed by etching.

We also performed experimental tests to determine the sheet resistance at various stages of the process. In particular, we measured the sheet resistance of the double ITO structure of FIG. 3A at seven locations where it was intended to etch the double ITO structure away, and obtained surface resistance values in the range 106.26 and 114.73 Ω/sq. Etching step 3 was performed using the experimental conditions of example 6. Following step 4, the sheet resistance at these locations was measured again, and found to be unmeasurably high using the milliohm ohmmeter used to perform the measurement. It is believed to be in the Giga-ohm range.

By contrast, Table 2 shows the sheet resistance at 5 locations of the double ITO structure of FIG. 3A where it was not intended to etch the double ITO structure away, and the sheet resistance of the corresponding location following the etching step 3 and step 4. The resistance is very similar, showing that the double ITO structure has been hardly damaged in these locations. All are in the range 120 Ω/sq plus or minus 20 Ω/sq.

TABLE 2

| Sheet resistance (Ohms/sq) | |
| --- | --- |
| Before Etching | After Etching |
| 113 | 110 |
| 117 | 117 |

TABLE 2-continued

| Sheet resistance (Ohms/sq) | |
| --- | --- |
| Before Etching | After Etching |
| 118 | 119 |
| 123 | 123 |
| 114 | 113 |

Figure 11A:
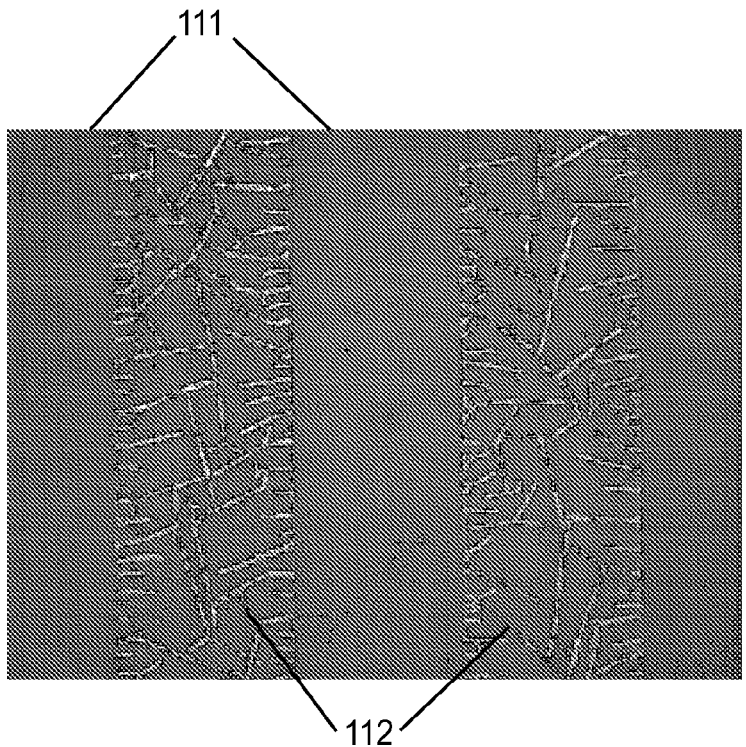
FIGS. 11A, 11B, 11C and 11D are optical microscope images produced by carrying out the method of FIG. 2, with an etching step of the method carried out for different respective lengths of time.
Figure 11B:
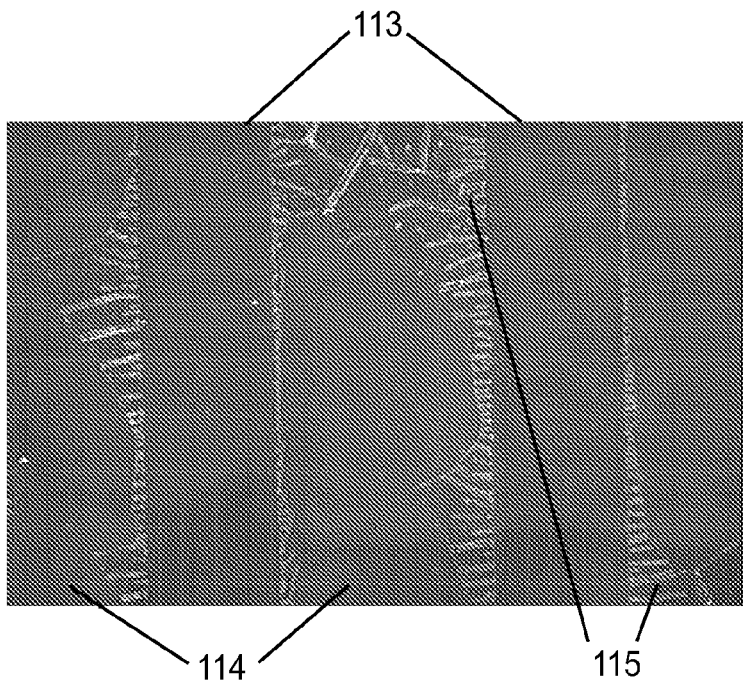
Figure 11C:
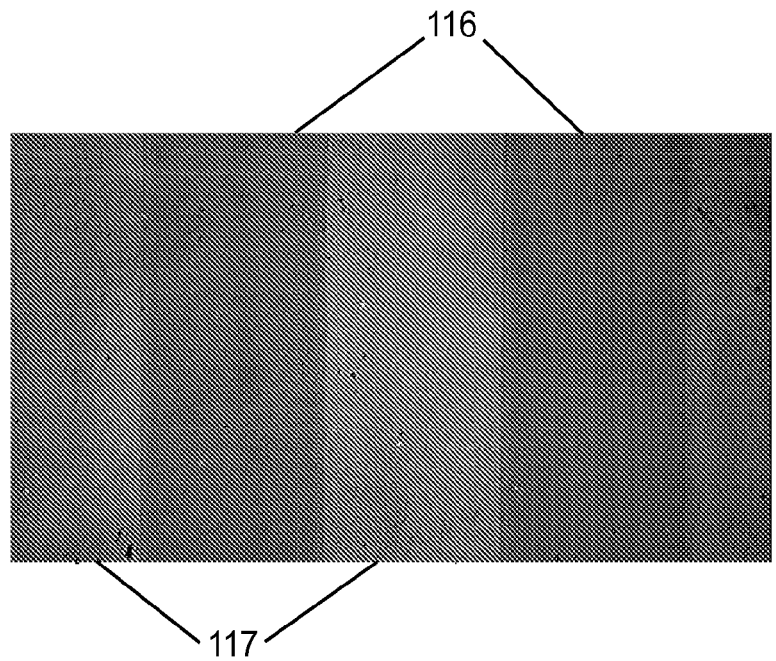
Figure 11D:
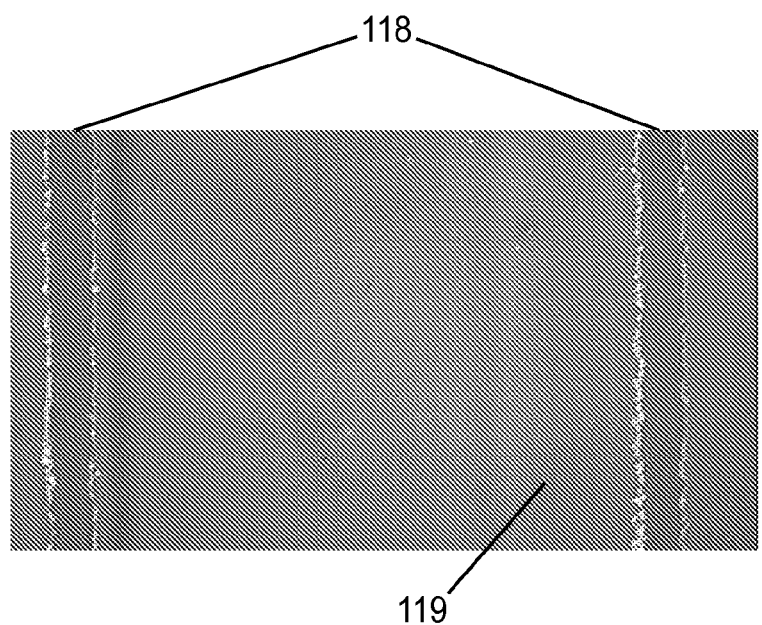

FIG. 11A-11D are optical microscope images, showing respectively samples which have been processed using all the steps of the method of FIG. 2, using different respective times in the etching step 3. FIGS. 11A, FIGS. 11C and 11D were produced under the experimental conditions of Examples 2, 3 and 5 respectively. Thus, for the sample of FIG. 11A, the etching time was 10 seconds. FIG. 11B was produced in the same way as FIG. 11A, except that the etching time was 20 seconds. For the sample of FIG. 11C, the etching time was 30 seconds. For the sample of FIG. 11D, the etching time was 6 minutes. Thus, the sequence of images 11A-11D gives a good impression of how much of the double ITO stack would be etched away at different times during an etching step 3.

FIG. 11A (which is identical to FIG. 4) contains elongate areas 111 which are un-etched ITO. These are the upper layer 11 of the double ITO structure of FIG. 3E. The areas 111 are the parts of the double ITO structure which were covered by the patterned photo-resist during etching step 3. The areas 111 are separated by elongate areas 112, which correspond to parts of the double ITO structure exposed by the patterned photo-resist during etching step 3. In areas 112, the SiO$_2$ has not been removed, but many cracks have appeared in it.

FIG. 11B contains elongate areas 113, which correspond to the areas 111. The double ITO structure remains intact in areas 113. In some areas 114 between the areas 113 the PET substrate 14 is exposed. In other areas 115 between the areas 113 some SiO$_2$ remains. At this stage, the sample is under-etched.

FIG. 11C contains elongate areas 116 which correspond to the areas 111. The double ITO structure remains intact in the areas 116. Between the areas 116 are elongate areas 117 where the double ITO structure has been completely removed, and the PET substrate is exposed. The cracked SiAlO$_x$ (which had been visible in FIG. 11B) has been completely removed.

FIG. 11D (which is identical to FIG. 7) contains areas 118 where the double ITO structure remains, and elongate areas 119 where the PET substrate 14 is fully exposed. The areas 118 are narrower than the areas 116 of FIG. 11C. In other words, the areas 118 have been partly etched away at their sides, thereby increasing the spaces between the areas 118. Thus, the sample has been over-etched.

The sequence of images FIG. 11A to 11D thus illustrates the mechanism for etching of the silicon dioxide: crack formation in the silicon dioxide, followed by removal of pieces of silicon dioxide. The sequence of images FIG. 11A to 11D further illustrates how a skilled reader can determine a suitable etching time for a given set of etching conditions. Specifically, since FIG. 11C presents correct etching, the skilled reader can select an etching time of 30 seconds for these etching conditions.

2. Performing Step 3 Using an Etching Composition Including Ferric Chloride

We now turn to a second set of examples. Steps 1-2 and 4 were performed in the same way as the examples described above, but step 3 in these examples was performed using an etchant composition which was an aqueous solution of hydrochloric acid and ferric chloride. That is, the ferric chloride replaced the cupric chloride of the previous examples. The chemical reactions were the same as the ones given above for the cupric chloride case, but with $Fe^{3+}$ replacing $Cu^{2+}$, and $Fe^{2+}$ ions replacing $Cu^+$. Table 3 shows the 12 sets of experimental conditions used. These corresponded to an etchant composition with an oxidation-reduction potential (ORP) in the range 500 mV-620 mV measured at 27° C. One suitable value was 590 mV.

TABLE 3

| Example number | $Fe^{3+}$ Concentration (g/l) | HCl Concentration (g/l) | Temperature (° C.) | Etch time (min) |
|---|---|---|---|---|
| 7 | 30 | 10 | 50 | 2 |
| 8 | 40 | 10 | 50 | 2 |
| 9 | 70 | 10 | 50 | 2 |
| 10 | 30 | 1 | 50 | 2 |
| 11 | 40 | 1 | 50 | 2 |
| 12 | 70 | 1 | 50 | 2 |
| 13 | 30 | 25 | 50 | 2 |
| 14 | 40 | 25 | 50 | 2 |
| 15 | 70 | 25 | 50 | 2 |
| 16 | 30 | 1 | 75 | 1 |
| 17 | 40 | 1 | 75 | 1 |
| 18 | 70 | 1 | 75 | 1 |

All of the conditions in Table 3 good etching results provided the etching time was as shown. If the etching time was significantly shorter than as shown, there was under-etching. If the etching time was significantly longer than as shown, there was over-etching. The correct etching time was derived by experiment, to avoid over- and under-etching results.

Figure 12:
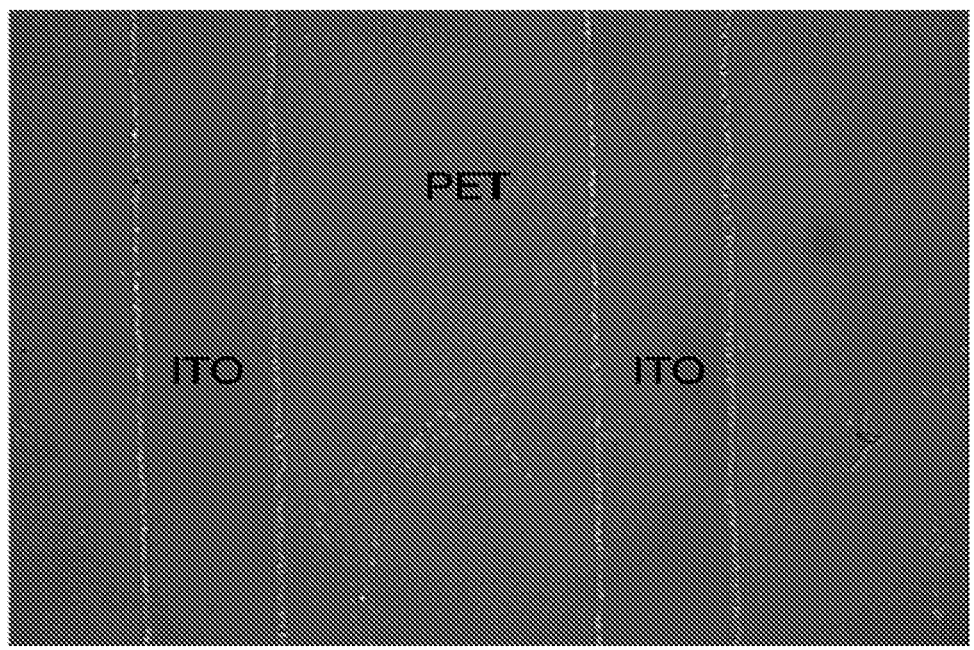
FIG. 12 is an optical image of a structure procedure produced using the method of FIG. 2 under alternative experimental conditions.

FIG. 12 is an optical microscopy image of a sample etched with the third of these etchant compositions (70 g/l of $Fe^{3+}$, 10 g/l of HCl, a temperature of 50° C., for a time of 2 minutes). Again, there are clearly defined leads and spaces. The leads are the areas where the double ITO structure is not etched, and the spaces are where the double ITO structure has been etched away. If the etching had not been acceptable, we would not have observed such clearly defined leads and spaces.

More generally, successful results were obtained for examples in which the concentration of the ferric ions was in the range 30-70 g/liter, the concentration of the HCl was 1-25 g/liter, and the temperature was in the range 50-75° C.

Industrial Applicability

As demonstrated above, the etching method of the present invention is capable of simultaneously etching the three layers of a double ITO structure (an upper transparent conductive electrode film, and intermediate layer of $SiAlO_x$, and a lower transparent film on a PET substrate). It provides, in a single etching operation, an etched structure with an edge having a normal-tapered shape. "Normal-tapered" means that the lead has a narrow top surface and a broad bottom surface. Such a structure is exhibited by the samples used to produce images FIGS. 9A-9C, as we have verified by measuring the cross section of these samples. We did not observe a "stepwise shape", associated with bad etching, and which can be produced under one of two scenarios: (1) the top ITO layer 11 is etched faster than the $SiO_2$ layer 12 and the bottom ITO layer 13, or (2) both top and bottom ITO layers 11, 13 are etched faster than the middle silica layer 12.

By the use of the etching composition of the present invention, a three layered transmissive-type display sensor pattern is produced with high production efficiency and in an environmental friendly way.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

The invention claimed is:

1. A method for etching a layered structure, the method comprising:
    using a patterned mask to expose a portion of the layered structure; and
    contacting the exposed portion of the layered structure with an acidic solution containing a transition metal chloride and hydrochloric acid (HCl),
    wherein the layered structure comprises a first ITO layer formed on a transparent or semi-transparent substrate, an $SiO_2$ layer disposed on the first ITO layer, and a second ITO layer disposed on the $SiO_2$ layer opposite the first ITO layer, and
    wherein each layer of the exposed portion of the layered structure is removed during the contacting step.

2. The method according to claim 1, wherein the etching of the exposed portion of the layered structure is at a temperature of about 45 to 85° C.

3. The method according to claim 1, wherein the acidic solution is fluorine-free.

4. The method according to claim 1, wherein the acidic solution comprises hydrochloric acid (HCl) having a concentration of about 0.02-1.0N.

5. The method according to claim 1, wherein the transition metal chloride is cupric chloride ($CuCl_2$).

6. The method according to claim 5, wherein a concentration of the cupric chloride ($CuCl_2$) is about 50 g/L-200 g/L.

7. The method according to claim 1, wherein the transition metal chloride is ferric chloride ($FeCl_3$).

8. The method according to claim 7, wherein a concentration of the ferric chloride ($FeCl_3$) is about 50 g/L-200 g/L.

9. The method according to claim 1, wherein the etching of the layered structure is conducted for about 20 seconds to 2 minutes.

10. The method according to claim 1, wherein the etching of the layered structure is conducted for about 25-60 seconds.

11. The method according to claim 1, wherein the silicon dioxide ($SiO_2$) is doped with metal.

12. The method according to claim 1, wherein the $SiO_2$ is an aluminum-doped silicon dioxide ($SiAlO_x$).

13. The method according to claim 1, wherein the etching exposes a portion of the transparent or semi-transparent substrate, the exposed portion of the transparent or semi-transparent substrate has a light transmittance that is greater than 85% throughout a wavelength range of 450-800 nm.

14. The method according to claim 1, wherein an unetched portion of the layered structure has a resistance that is less than 150 Ω/sq after etching the layered structure.

15. The method according to claim 1, wherein the transparent or semi-transparent substrate is selected from polyethylene terephthalate (PET), polyethylene naphthalate (PEN), polyimide (PI), polycarbonate (PC), polyethersulfone (PES), polyacrylate (PA), polynorbornene (PNB), polyetheretherketone (PEEK), polyetherimide (PEI), or glass.

16. A method for etching a layered structure, the method comprising:
    using a patterned mask to expose a portion of the layered structure;

contacting the exposed portion of the layered structure with an acidic solution containing a transition metal chloride and hydrochloric acid (HCl),
wherein the layered structure is formed on a transparent or semi-transparent substrate,
wherein the layered structure has at least one layer of ITO and at least one layer of $SiO_2$ and
wherein each layer of the exposed portion of the layered structure is removed during the contacting step.

17. The method according to claim 1, wherein the transparent or semi-transparent substrate is selected from polyethylene terephthalate (PET), polyethylene naphthalate (PEN), polyimide (PI), polycarbonate (PC), polyethersulfone (PES), polyacrylate (PA), polynorbornene (PNB), polyetheretherketone (PEEK), or polyetherimide (PEI).

18. The method according to claim 16, wherein the transparent or semi-transparent substrate is selected from polyethylene terephthalate (PET), polyethylene naphthalate (PEN), polyimide (PI), polycarbonate (PC), polyethersulfone (PES), polyacrylate (PA), polynorbornene (PNB), polyetheretherketone (PEEK), or polyetherimide (PEI).

\* \* \* \* \*